US006327515B1

(12) United States Patent
Shea et al.

(10) Patent No.: US 6,327,515 B1
(45) Date of Patent: Dec. 4, 2001

(54) PERFORMANCE TUNING OF AN INSERTER SYSTEM BASED UPON A ROLLING AVERAGE OF PAGE COUNTS FOR MAILPIECES TO BE PROCESSED

(75) Inventors: Michael Shea, Litchfield; Eugene Pritchard, Brookfield; William G. Hart, Jr., Sandy Hook; Paul Mayer, Middlebury, all of CT (US)

(73) Assignee: Pitney Bowes Inc., Stamford, CT (US)

(*) Notice: Subject to any disclaimer, the term of this patent is extended or adjusted under 35 U.S.C. 154(b) by 0 days.

(21) Appl. No.: 09/474,824

(22) Filed: Dec. 29, 1999

(51) Int. Cl.[7] ....... G06F 7/00

(52) U.S. Cl. ....... 700/221; 700/220; 270/52.02

(58) Field of Search ....... 700/220, 221, 700/223, 224, 225; 270/52.02

(56) References Cited

U.S. PATENT DOCUMENTS

| | | | | |
|---|---|---|---|---|
| 4,790,119 | | 12/1988 | McDaniels | 53/411 |
| 4,800,505 | | 2/1989 | Axelrod et al. | 700/221 |
| 4,829,443 | * | 5/1989 | Pintsov et al. | 364/464.03 |
| 4,987,547 | | 1/1991 | Rabindran et al. | 700/220 |
| 5,008,827 | * | 4/1991 | Sansone et al. | 364/464.2 |
| 5,083,281 | | 1/1992 | Rabindran et al. | 700/220 |
| 5,493,106 | | 2/1996 | Hunter | 235/375 |
| 5,510,997 | * | 4/1996 | Hines et al. | 364/478 |
| 5,618,037 | | 4/1997 | Chang et al. | 271/258.02 |
| 5,684,706 | * | 11/1997 | Harman et al. | 364/464.16 |
| 5,768,132 | | 6/1998 | Cordery et al. | 705/410 |
| 5,816,715 | | 10/1998 | Harman et al. | 400/71 |
| 5,818,724 | | 10/1998 | Brewster, Jr. et al. . | |
| 5,826,869 | | 10/1998 | Nyffenegger et al. | 270/52.02 |
| 5,949,687 | * | 9/1999 | Emigh et al. | 364/478.08 |

* cited by examiner

*Primary Examiner*—Christopher P. Ellis
*Assistant Examiner*—Khoi H. Tran
(74) *Attorney, Agent, or Firm*—Michael J. Cummings; Michael E. Melton

(57) ABSTRACT

An apparatus for assembling mailpieces and a method for controlling such apparatus. The apparatus includes a document feeder for feeding sets of documents to a chassis for assembly into mailpieces a constant rate. Because the number of documents varies the time to assemble a set varies and it is possible that a set may not be available when the chassis is ready to cycle; resulting in a cycle in which no mailpiece is processed. To correct for this the average number of documents for a number of mailpieces to be processed is determined and a nominal chassis speed and cycling rate are determined correspondingly. The actual chassis speed is then periodically updated to approach the nominal speed.

20 Claims, 5 Drawing Sheets

PERFORMANCE TUNING OF AN INSERTER SYSTEM BASED UPON A ROLLING AVERAGE OF PAGE COUNTS FOR MAILPIECES TO BE PROCESSED

BACKGROUND OF THE INVENTION

This invention relates to the preparation of large mailings and the like. More particularly it relates to systems and apparatus for the preparation of documents and the assembly of multiple mailpieces including such documents.

The term "mailpieces" as used herein means items intended to be delivered by a postal service or private courier service. Typically preparation of mailpieces includes, but is not limited to, printing or otherwise providing documents including variable information pertaining to addressees of the mailpieces and the assembly of such documents with other elements of the mailpiece. The term "assembly" as used herein means the execution of actions to incorporate the documents into mailpieces. Typically, such actions can include: accumulating documents with other materials such as preprinted inserts, folding and inserting the resulting accumulations into envelopes, printing addresses and other information on the outside of the envelopes, and franking the mailpiece with an appropriate postage amount.

Inserter systems for the assembly of mailpieces are well known. A typical inserter system is shown in FIG. 1. Inserter system 10 includes burster/feeder 12 which inputs preprinted documents in fanfold form, separates the documents and removes and discards sprocket feed strips FS from the edges of the document. Each group of documents for a particular mailpiece includes at least one control document CD. On control documents CD strips FS are marked with code BC which is read by scanner 14 before strips FS are removed. In simpler systems code BC can be a "dash code" of the type known for use in directly controlling inserter systems. In newer, more complex systems code BC can be a conventional bar code which serves as a pointer to a mailpiece record which record contains information for controlling the inserter; as will be more fully described below.

In other known inserterstems, the documents can be in cut shed form and a cut sheet feeder can be used in place of burster/feeder 12. Control document CD, and any additional associated pages are fed from burster feeder 12 to accumulator 16 where documents for each mailpiece are formed into separate accumulations A and folded.

Accumulation A is then fed to insert stations 20A and 20B where preprinted inserts I are added to form accumulations A1 and A2. Those skilled in the art will of course recognize that the number of such insert stations used will vary from application to application.

Accumulation A2 is then fed to insert station 22 where it is inserted into an envelope and sealed to form mailpiece MP. Mailpiece MP is then fed to address printer 24 which prints address AD on the outside of the envelope. Depending on the size of the print field of printer 24, printer 24 also can be used to print other information such as a variable return address (or other text message) RA, logo L, and postal barcode PBC on the envelope. (Those skilled in the art will recognize that dash codes as described above typically cannot include sufficient information to define even address AD so that systems incorporating dash codes typically use window envelopes to provide addressing information.) System 10 also includes out stacker 30 for diverting mailpieces when an error is detected. As noted above inserter systems wherein said code BC is a barcode which is used as a pointer to a mailpiece record (i.e. an electronic record associated with a mailpiece to be assembled) are known. By incorporating data for controlling assembly of mailpieces in mailpiece records an essentially unlimited amount of data can be associated with each mailpiece. Thus addresses, return addresses, logos, and postal bar codes can all readily be specified in addition to specification of the number of inserts to be added at each insert feeder, postage amounts, etc. Systems incorporating such mailpiece records are described in commonly assigned U.S. Pat. No. 4,800,505; to: Axelrod et al.; for: Mail Preparation System; issued Jan. 24, 1989, which is hereby incorporated by reference. Embodiments of the system of U.S. Pat. No. 4,800,505 are marketed by the assignee of the present application under the name "Direct Connection", described in *The Direct Connection, version* 1.30.

While systems such as those described above have proven highly successful certain disadvantages remain. In particular the fact that chassis cycles at fixed intervals while documents are delivered at varying intervals means that a potential exists that no documents will be available for a particular cycle. Clearly the possibility of such "dry holes" can be eliminated simply by operating the chassis slowly enough to assure that the maximum number of sheets can be accumulated in one cycle but, equally clearly, operating at that minimal speed will be highly inefficient in the general case where relatively few accumulations with a maximum number of sheets are expected. Conversely, in mailing jobs having a relatively large number of large accumulations, running too fast will cause a large number of dry holes and a higher throughput is achieved by operating the chassis at a slower speed. This problem is exacerbated by the fact that accumulation size will vary with within mailing jobs.

Heretofore efforts to improve the operating efficiency of inserter systems have not addressed this problem in a direct, simple and cost effective manner. Thus, U.S. Pat. Nos. 4,987,547 and 5,083,281; to: Rabindran et al. teach a method for optimizing system speed to minimize time lost to jams and stoppages; while U.S. Pat. No. 5,826,869; to: Nyffenegger teaches a non-standard, buffered, variable speed document feeder which it is believed would substantially add to the cost and complexity of an inserter system. Thus it is an object of the subject invention to provide a simple, cost-effective method for tuning the performance of an inserter system during the run-time of a mailing job.

BRIEF SUMMARY OF THE INVENTION

The above object is achieved and the disadvantages of the prior art are overcome in accordance with the subject invention by means of a method and apparatus for processing mailpieces. An inserter system includes a chassis for assembling the mailpieces, the chassis operating cyclically with successive accumulations advancing at the end of each cycle, and a document feeder for feeding accumulations of documents to the chassis, the accumulations containing varying numbers of documents. The mailpieces each include a control document, the control documents each including data for determining a unique identification code. The method includes the steps of storing a mailing control file, the mailing control file comprising a plurality of mailpiece records, each of the records including a plurality of fields, the fields containing data for controlling assembly of a mailpiece, and each of the records including one of the unique identification codes, whereby each of the records defines preparation of at least one corresponding mailpiece, the records also defining the number of documents comprised in each of the mailpieces; and operating the document feeder at a fixed linear speed, whereby accumulations are available for input to the chassis at varying intervals substantially depending upon the number of documents in corresponding accumulations, so that there is a possibility that no accumulation will be available for particular cycles of the chassis. The chassis is initially operated at a selected speed and which is periodically updated by preferably first determining a measure of the average number of documents to be formed into accumulations for a predetermined number of mail pieces next to be processed and then computing a nominal chassis speed as a function of the measure. A determination between the difference of the nominal chassis speed and the current chassis speed is achieved and if the difference is positive and greater than a first positive value, increasing the chassis speed, and if the difference is negative and less than minus the first value, decreasing the chassis speed. The apparatus then prepares the corresponding mailpieces in accordance with the records.

In accordance with one aspect of the subject invention the chassis speed is increased or decreased by a predetermined fixed amount. In accordance with another aspect of the subject invention the fixed amount is a predetermined function of a system parameter.

In accordance with another aspect of the subject invention the measure is the total number of documents in the predetermined number of mailpieces.

In accordance with another aspect of the subject invention the apparatus further includes a controller and updating of the chassis speed is carried out by the controller during processing of the mailpieces.

In accordance with another aspect of the subject invention the records are generated by a data processing system and the computations for updating of the chassis speed are carried out off-line by the data processing system which then includes an indication whether the chassis speed is to be increased, decreased, or remain unchanged in each of the records.

In accordance with another aspect of the subject invention the predetermined number of mailpieces is determined as a function of the variation in the number of documents in the mailpieces.

In accordance with another aspect of the subject invention the records are generated by a data processing system and the predetermined number of mailpieces is determined off-line by the data processing system which then downloads the predetermined number to the apparatus.

In accordance with another aspect of the subject invention the predetermined number of mailpieces varies during a mailing job as the variation in the number of documents in a mailpiece changes and the nominal chassis speed is computed as a function of the average number of documents in the mailpieces.

Other objects and advantages of the subject invention will be apparent to those skilled in the art from consideration of the attached drawings and the detailed description set forth below.

DETAILED DESCRIPTION OF PREFERRED EMBODIMENTS OF THE SUBJECT INVENTION

Figure 2:
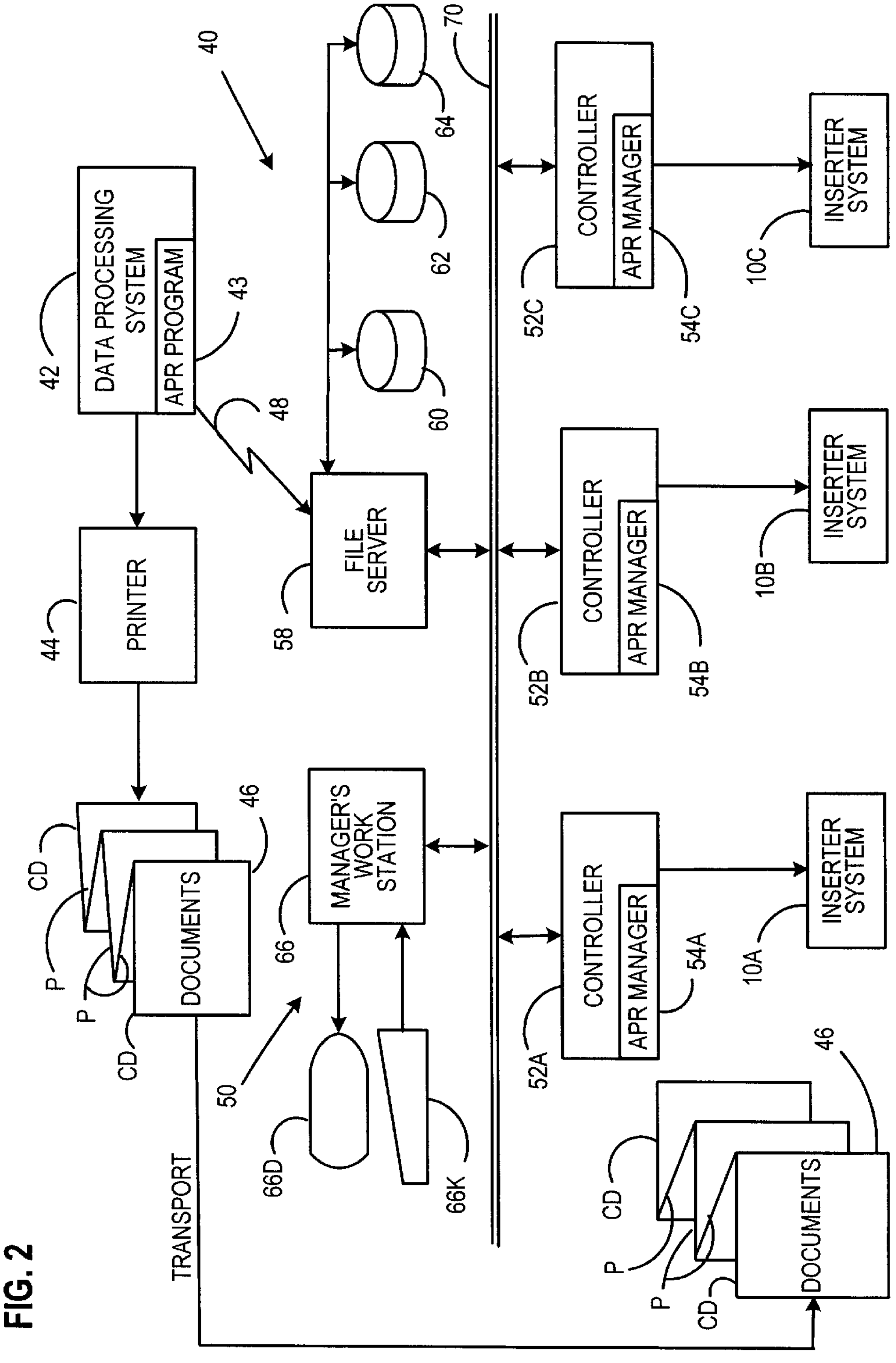
FIG. 2 shows a schematic block diagram of a system for preparing mailpieces.

FIG. 2 shows mail preparation system 40 which includes data processing system 42 and mailpiece assembly system 50.

Data processing system 42 is programmed in a conventional manner to generate documents 46, which include control documents CD and associated documents P; with one control document CD and its associated documents P being associated with each mailpiece, wherein control documents CD are marked with barcode pointers to mailpiece records in the manner described above. In the embodiment shown, system 42 controls printer 44 to print documents 46 directly and documents 46 are transported physically for assembly; however, any convenient method of output and transport, such as electronic output and transmission for remote printing, can be used and is within the contemplation of the subject invention.

Figure 3A:
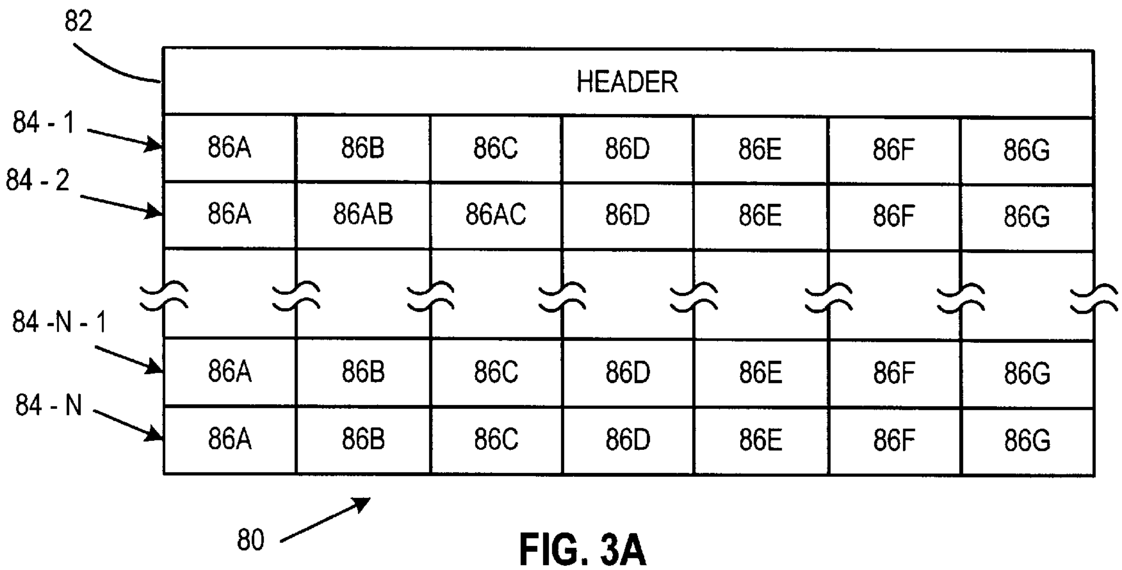
FIGS. 3A, 3B and 3C show a mailing control file and a typical mailpiece record and header.

Data processing system 42 also generates and outputs mailing control file 80, X is shown in FIG. 3A, which includes header 82 and a plurality of mailpiece records 84-1 through 84-N, in a conventional manner. Mailpiece records 84-1 through 84-N each include a plurality of fields 86A–86G containing data for controlling assembly of the mailpiece.

Figure 3B:
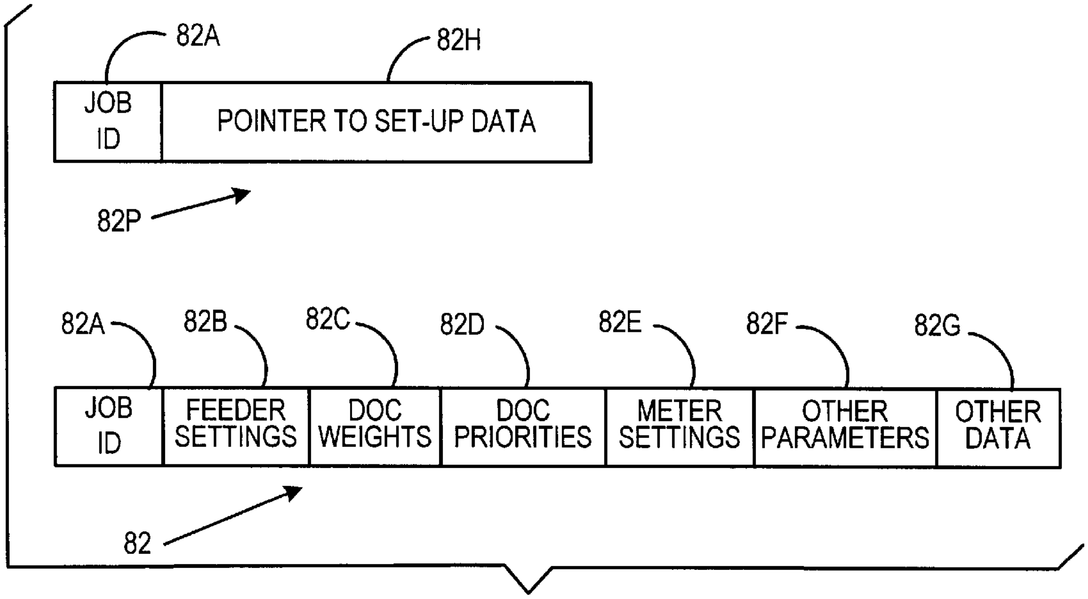

In a preferred embodiment, the mailing control file also includes data in header 82, shown in FIG. 3B, for defining set-up parameters for the mailing job corresponding to file 80. In FIG. 3B header 82 includes a job ID in field 82A, feeder settings in field 82B, document weights in field 82C, document priorities in field 82D, postage meter settings in field 82E and other set-up parameters, as discussed above, in field (or fields) 82F. In other embodiments of the subject invention field (or fields) 82G can contain additional information relating to the mailing as a whole, such as an account number to be charged to mailing cost centers.

In another preferred embodiment information such as is shown in header 82 can be stored as a separate file, which can be part of a database of job set-up modes. This separate file can then be accessed in any convenient manner. For example, the separate file name can be derived as a function of the job name; e.g. if the job name is mailxxxx.job then the separate record name would be mailxxxx.set. Or, header 82P, also shown in FIG. 3B, which includes pointer 82H to the separate file, can be used in place of header 82.

Figure 3C:
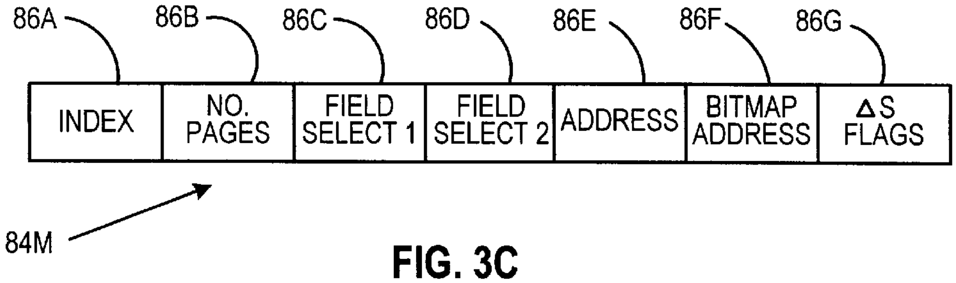

FIG. 3C shows typical mailing record 84-M. (In general, the content and format of mailpiece records can be freely specified by system users. However, the record must include an index, or identification code, which establishes correspondence between the record and a corresponding mailpiece.) In record 84-M field 86A contains an index, or identification code; field 86B specifies the number of pages in the mailpiece; fields 86C and D specify whether or not corresponding insert stations will add inserts to the mailpiece; field 86E is a printer control field which specifies an address for the corresponding mailpiece; and field 86F is a printer control field. Field 86G relates to control of the chassis speed, as will be described below.

The mailing control file is communicated to mailpiece assembly system 50 through communications link 48, which can utilize any convenient form of communication, such as electronic data communication or the physical transfer of media without departing from the scope of the subject invention.

Figure 1:
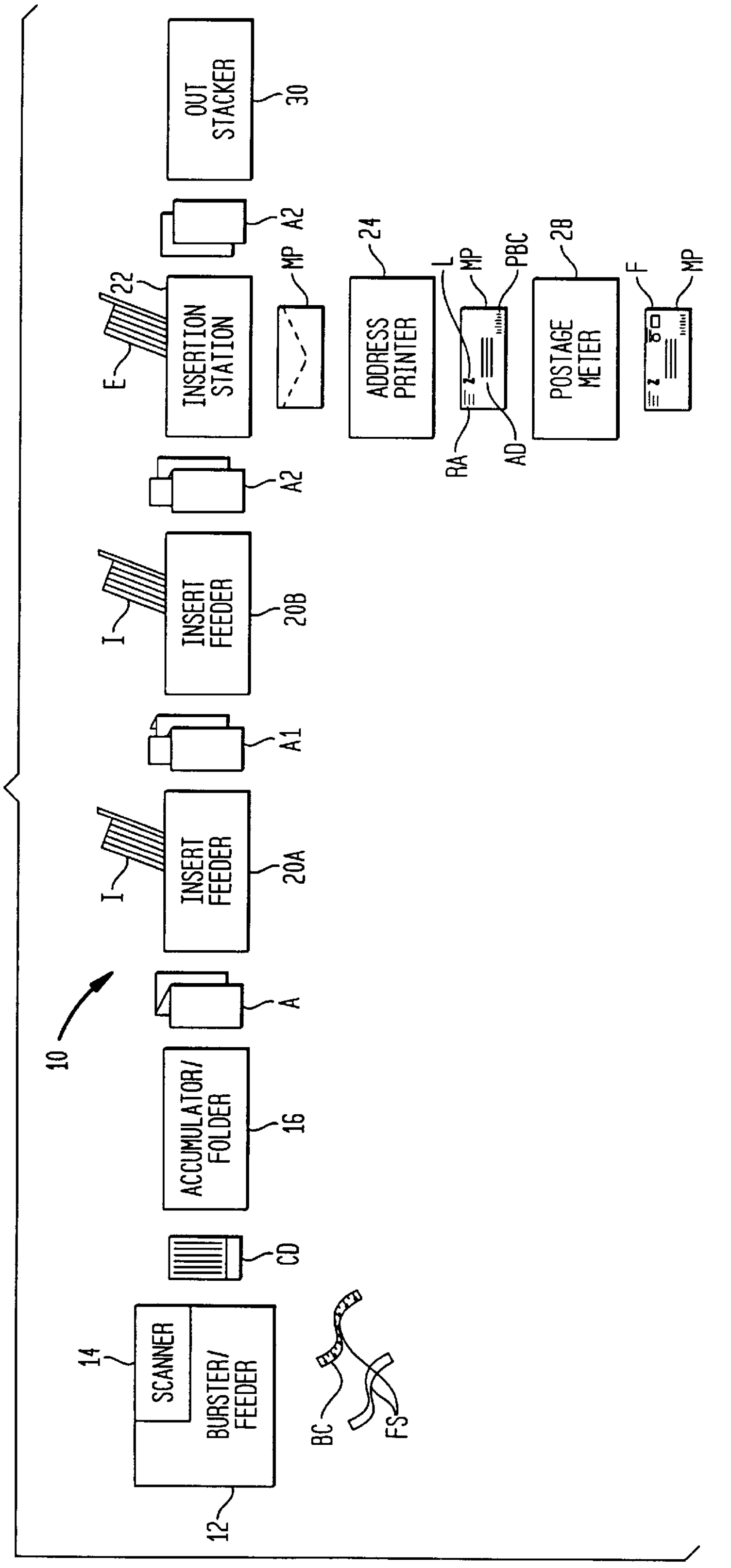
FIG. 1 (PRIOR ART)
FIG. 1 shows a schematic block diagram of a prior art inserter system.

In the embodiment shown in FIG. 2, mailpiece assembly system 50 includes inserter systems 10A, 10B, and 10C, which are substantially similar to conventional inserter system 10 described above with reference to FIG. 1, but necessarily must be of the type wherein control documents CD include a barcode pointer to a mailpiece record to carryout the functions of mailpiece assembly. In other embodiments different types of inserter systems having expanded (e.g. more insert modules) or different functions (e.g. matched mail generation or address verification), but still including barcode pointers, can be used without departing from the scope of the subject invention.

Mailpiece assembly system 50 also includes controllers 52A, 52B, and 52C for controlling operation of inserter systems 10A, 10B, and 10C in a manner which will be described more fully below.

Mailpiece assembly system also includes file server 58 which manages mailing control file database 60 which stores mailing control files downloaded from data processing system 42, and which also communicate appropriate mailing control files to controllers 52A, B or C as mailings are assigned to inserter systems, as will be more fully described below.

Mailpiece assembly system also includes manager's workstation 66, which includes display 66D and keyboard 66K through which a site manager can provide operational management input such as accessing and editing database 60 or assigning mailings to various inserter systems.

Communications among workstation 66, file server 58 and controllers 52A, B and C is preferably carried out over a conventional local area network in a manner well understood by those skilled in the art and which need not be discussed further for an understanding of the subject invention.

Figure 4A:
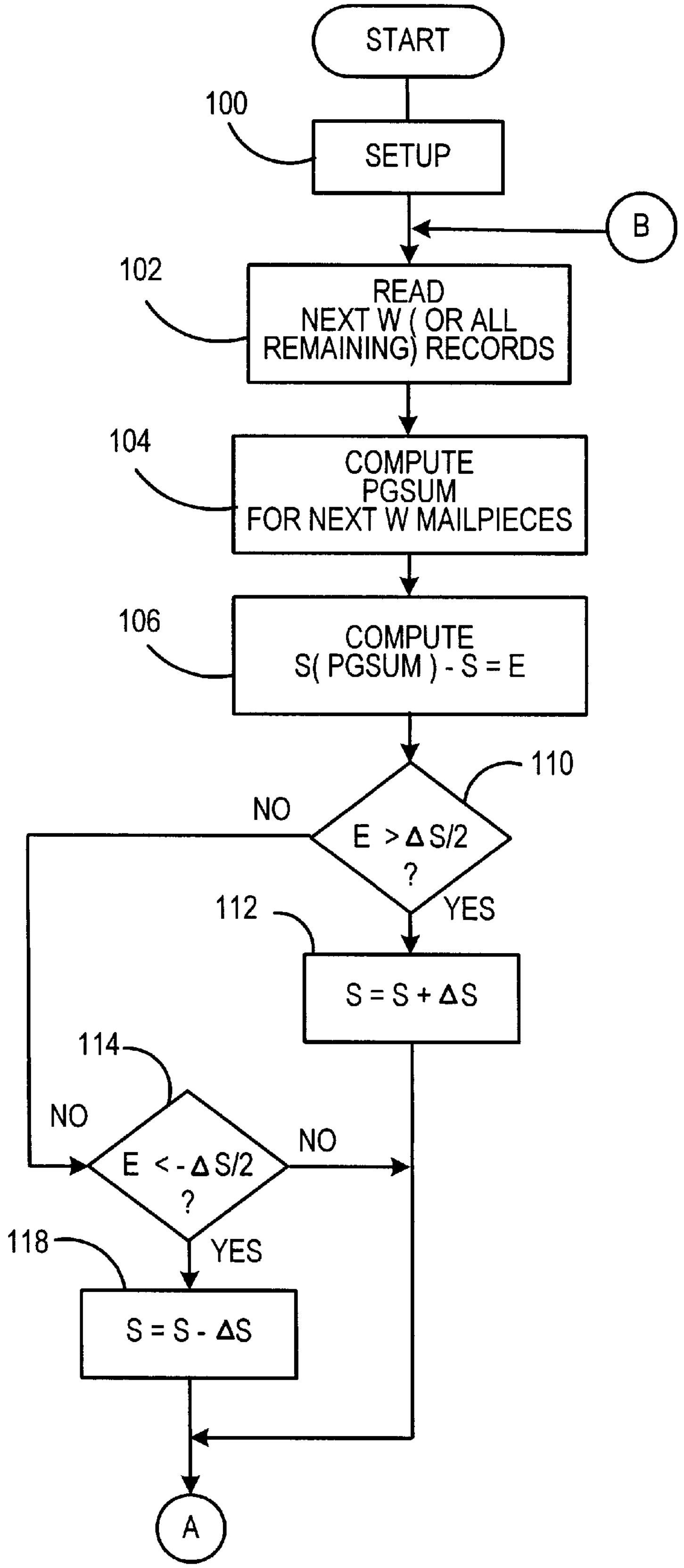
FIGS. 4A and 4B show a flow diagram of the operation of the system of FIG. 2 to optimize the chassis speed in accordance with the subject invention.
Figure 4B:
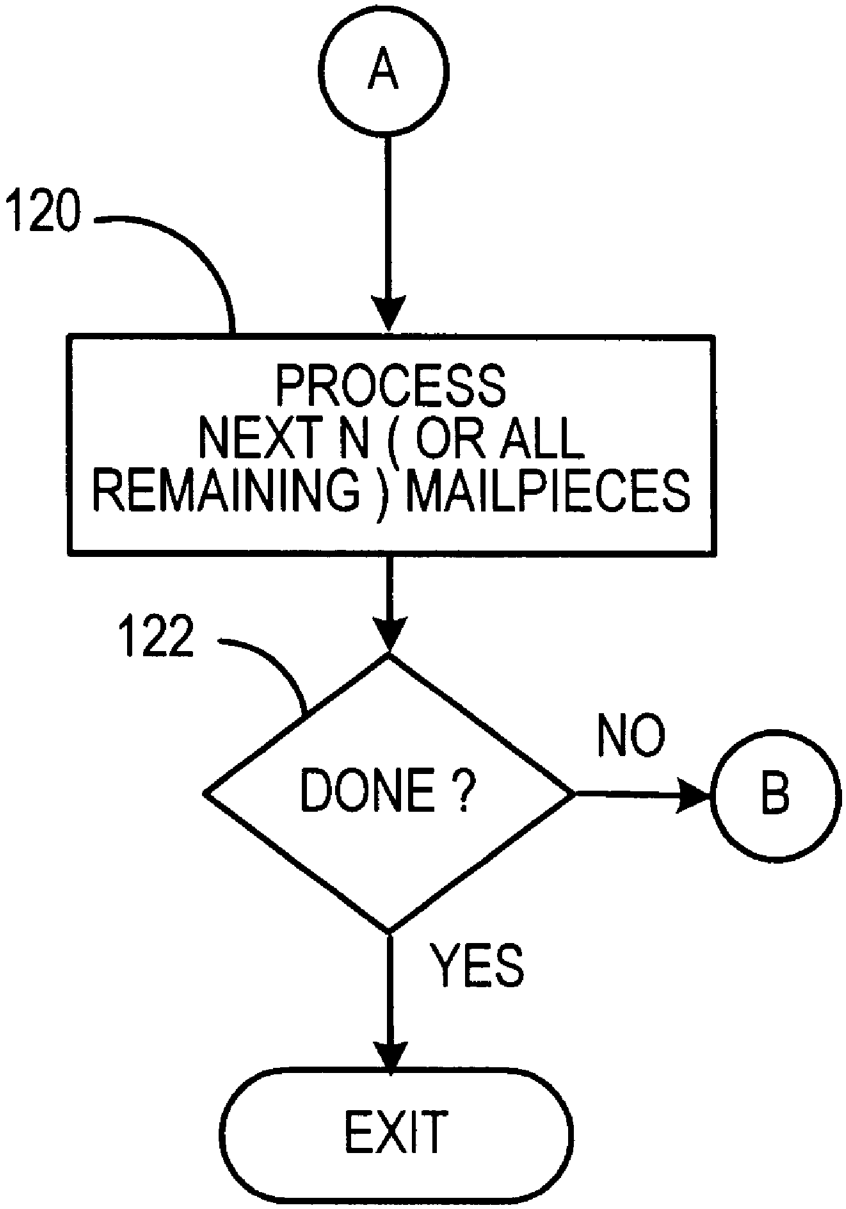

FIGS. 4A and B show a flow diagram of the operation of a selected controller, hereinafter assumed for purposes of explanation to be controller 52A, to vary the chassis speed to optimize performance (i.e. minimize the number of "dry holes") in accordance with a preferred embodiment of the subject invention. (As noted above the document feeder operates at a fixed speed, but delivers accumulations of documents at varying intervals. Linear speeds in document feeders are in general much higher than in chassis and can be set so that, for the typical mailpiece, the document accumulation will be available for the next chassis slot. By running the document feeder at a constant speed the subject invention takes the fullest advantage of this capability while adjusting chassis speed, as will be described below, to accommodate temporary increases in the average number of sheets in a document. The subject invention is also advantageous in that the document feeder can be more easily tuned for optimal paper handling when it runs at a fixed linear speed.)

At 100 controller 52A, sets up initial parameter values: L, N, $S_0$, ΔS, and W. L is the document length and is preferably downloaded from system 42. N is the number of mailpieces which are processed in the intervals between updating of the chassis speed, as will be described further below. Values for N can be selected based on tradeoffs among the desired accuracy (the more often the chassis speed is updated the more accurately it will track the desired profile), the chassis acceleration (it is inefficient to update the nominal chassis speed more rapidly than the chassis can respond), and the computational burden (which of course increases the more frequently the chassis speed is updated). While values for N of about 10 percent of the number of pieces processed per hour are believed generally effective those skilled in the art will be able to select appropriate values of N for particular applications in accordance with the above tradeoffs.

$S_0$ is an initial chassis speed which can be a fixed value or can be based on estimates of the job characteristics.

ΔS is the size of the speed increment by which the chassis speed can be adjusted every N mailpieces. ΔS can be either a program constant or can be a constant function of a system parameter for various systems, for example a constant fraction of the maximum system speed. Preferably ΔS will be selected to be of moderate size. Too small a value will make it difficult for the system to reach an optimal speed, while too large a value will impose unnecessary stress on the system. Those skilled in the art will be able to select appropriate values of ΔS for particular applications in accordance with the above tradeoffs.

W is the window of mailpieces to be processed which are examined to adjust the chassis speed in accordance with the subject invention. W can be a fixed value or can be based on estimates of the job characteristics. Values of W are substantially based on the amount of variation in the number of documents comprised in each mailpiece. If the number of documents is substantially constant for long runs of mailpieces, W can be large with respect to N thereby reducing the rate of change of the chassis speed. Conversely, if the number of documents changes rapidly W can be selected smaller to more closely follow the mail job. While values for W of about 500–1000 mailpieces are believed generally effective, those skilled in the art will be able to select appropriate values of N for particular applications in accordance with the above tradeoffs.

In other embodiments of the subject invention, where parameter values such as L, $S_0$and W are based on estimates of the job characteristics these estimates can be carried out off-line by data processing system 42 and down loaded to system 50. In preferred embodiments this downloading is carried out in accordance with the method of commonly assigned, co-pending U.S. patent application Ser. No. 09/411,099, Title: SYSTEM AND APPARATUS FOR PREPARATION OF MAILPIECES AND METHOD FOR FILEBASED SETUP OF SUCH APPARATUS; filed Oct. 4, 1999, which is hereby incorporated by reference.

At 102 controller 52A reads the next W mailpiece records, and at 104 computes PGSUM, the total number of documents included in the next W mailpieces.

At 106 the controller computes the difference E between a nominal value, S(PGSUM), based on the average number of documents in the next W mailpieces, PGSUM, and the current chassis speed S. (To a good approximation the document feeder linear speed divided by the document length divided by the average number of documents per mailpiece, i.e. per accumulation, equals the average number of mailpieces per unit time and the chassis speed is adjusted to give a corresponding cyclic rate.)

It should be noted that in the embodiment shown W is constant so that PGSUM is directly proportional to the average number of mailpieces and the average need not be computed explicitly. In other embodiments where W can vary the actual average is computed and used to determine the nominal speed.

At 110 controller 52A determines if E is greater than a first value, preferably ΔS/2. If so, then at 112 the current speed S is increased by an increment ΔS; and if not then at 114 the controller determines if E is less than −ΔS/2, and if so, speed S is decreased by ΔS.

In any event, whether or not the current speed is adjusted, controller 52A goes to 120 and processes the next N mailpieces. Details of such processing are well known and are described for example in the above described commonly owned references, and need not be discussed further here for an understanding of the subject invention.

At 122 controller 52A determines if the mail job is done and, if not, returns to 102, and otherwise exits.

In another embodiment of the subject invention, the above calculations can be carried out off-line by data processing system 42 if that system has sufficient information such as document feeder linear speed, document lengths, etc. Returning to FIGS. 3A and C, in such embodiments an additional field 86G can be added to each of records 84M by system 42 to flag to controller 52A whether or not an increment ΔS is to be added or subtracted to the current chassis speed S or whether S is to remain unchanged when the records are accessed to process each mailpiece.

As discussed above, values for W can be varied if the variation in the distribution of documents in mailpieces requires. It should be noted that W can also be varied within a particular job by down loading plural successive values during set-up.

The embodiments described above and illustrated in the attached drawings have been given by way of example and illustration only. From the teaching of the present application those skilled in the art will readily recognize numerous other embodiments in accordance with the subject invention. Accordingly, limitations on the subject invention are to be found only in the claims set forth below.

What is claimed is:

1. A method for controlling apparatus for assembly of mailpieces, the apparatus including an inserter system comprising a chassis for assembling the mailpieces, the chassis operating cyclically with successive accumulations advancing at the end of each cycle, and a document feeder for feeding accumulations of documents to the chassis, the accumulations containing varying numbers of documents, the mailpieces each including a control document, the control documents each including data for determining a unique identification code, the method comprising the steps of:

- a) storing a mailing control file, the mailing control file comprising a plurality of mailpiece records, each of the records including a plurality of fields, the fields containing data for controlling assembly of a mailpiece, and each of the records including one of the unique identification codes, whereby each of the records defines preparation of at least one corresponding mailpiece, the records also defining the number of documents comprised in each of the mailpieces;
- b) operating the document feeder at a fixed linear speed, whereby accumulations are available for input to the chassis at varying intervals substantially depending upon the number of documents in corresponding accumulations, so that there is a possibility that no accumulation will be available for particular cycles of the chassis;
- c) initially operating the chassis at a selected speed and periodically updating the chassis speed by;
  - c1) determining a measure of the average number of documents to be formed into accumulations for a predetermined number of mail pieces next to be processed;
  - c2) computing a nominal chassis speed as a function of the measure;
  - c3) determining the difference between the nominal chassis speed and the current chassis speed;
  - c4) if the difference is greater than a first positive value, increasing the chassis speed; and
  - c5) if the difference is less than a first negative value, decreasing the chassis speed; and
- d) controlling the assembling means to prepare the corresponding mailpieces in accordance with the records.

2. A method as described in claim 1 wherein the chassis speed is increased or decreased by a predetermined fixed amount.

3. A method as described in claim 2 wherein the fixed amount is a predetermined function of a system parameter.

4. A method as described in claim 1 wherein the measure is the total number of documents in the predetermined number of mailpieces.

5. A method as described in claim 1 wherein the apparatus further includes a controller and updating of the chassis speed is carried out by the controller during processing of the mailpieces.

6. A method as described in claim 1 wherein the records are generated by a data processing system and the computations for updating of the chassis speed are carried out off-line by the data processing system which then includes an indication whether the chassis speed is to be increased, decreased, or remain unchanged in each of the records.

7. A method as described in claim 1 wherein the predetermined number of mailpieces is determined as a function of the variation in the number of documents in the mailpieces.

8. A method as described in claim 7 wherein the records are generated by a data processing system and the predetermined number of mailpieces is determined off-line by the data processing system which then downloads the predetermined number to the apparatus.

9. A method as described in claim 1 wherein the predetermined number of mailpieces varies during a mailing job as the variation in the number of documents in a mailpiece changes and the nominal chassis speed is computed as a function of the average number of documents in the mailpieces.

10. Apparatus for assembling mailpieces, the mailpieces each including a control document, the control documents each including data for determining a unique identification code, the apparatus comprising:

- a) storing means for storing a mailing control file, the mailing control file comprising a plurality of mailpiece records, each of the records including a plurality of fields, the fields containing data for controlling assembly of a mailpiece, and each of the records including one of the unique identification codes, whereby each of the records defines preparation of at least one corresponding mailpiece, the records also defining the number of documents comprised in each of the mailpieces;
- b) means for assembling the mailpieces, the assembling means including an inserter system comprising a chassis for assembling the mailpieces, the chassis operating cyclically with successive accumulations advancing at the end of each cycle, and a document feeder for feeding accumulations of documents to the chassis, the accumulations containing varying numbers of documents;
- c) a controller for:
  - c1) initially operating the chassis at a selected speed and updating the chassis speed in accordance with the records by;
    - 1.1) determining a measure of the average number of documents to be formed into accumulations for a predetermined number of mail pieces next to be processed by;
    - c1.2) computing a nominal chassis speed as a function of the measure;
    - c1.3) determining the difference between the nominal chassis speed and the current chassis speed;

c1.4) if the difference is than a first positive value, increasing the chassis speed; and c1.5) if the difference is less than a first negative value, decreasing the chassis speed; and c2) controlling the assembling means to prepare the corresponding mailpieces in accordance with the records.

11. Apparatus as described in claim 10 wherein the chassis speed is increased or decreased by a predetermined fixed amount.

12. Apparatus as described in claim 11 wherein the fixed amount is a predetermined function of a system parameter.

13. Apparatus as described in claim 10 wherein the predetermined number of mailpieces is determined as a function of the variation in the number of documents in the mailpieces.

14. Apparatus as described in claim 10 wherein the records are generated by a data processing system and the predetermined number of mailpieces is determined off-line by the data processing system which then downloads the predetermined number to the apparatus.

15. Apparatus as described in claim 10 wherein the predetermined number of mailpieces varies during a mailing job as the variation in the number of documents in a mailpiece changes and the nominal chassis speed is computed as a function of the average number of documents in the mailpieces.

16. Apparatus for assembling mailpieces, the mailpieces each including a control document, the control documents each including data for determining a unique identification code, the apparatus comprising:

a) storing means for storing a mailing control file, the mailing control file comprising a plurality of mailpiece records, each of the records including a plurality of fields, the fields containing data for controlling assembly of a mailpiece, and each of the records including one of the unique identification codes, whereby each of the records defines preparation of at least one corresponding mailpiece, the records also defining whether a chassis speed is to be increased, decreased or remain unchanged;

b) means for assembling the mailpieces, the assembling means including an inserter system comprising a chassis for assembling the mailpieces, the chassis operating cyclically with successive accumulations advancing at the end of each cycle, and a document feeder for feeding accumulations of documents to the chassis, the accumulations containing varying numbers of documents;

c) a controller for:

c1) initially operating the chassis at a selected speed and updating the chassis speed in accordance with the records; and c2) controlling the assembling means to prepare the corresponding mailpieces in accordance with the records.

17. Apparatus as described in claim 16 wherein the chassis speed is increased or decreased by a predetermined fixed amount.

18. Apparatus as described in claim 17 wherein the fixed amount is a predetermined function of a system parameter.

19. Apparatus as described in claim 16 wherein the records are generated by a data processing system and the predetermined number of mailpieces is determined off-line by the data processing system which then downloads the predetermined number to the apparatus.

20. A system for assembling mailpieces, the mailpieces each including a control document, the control documents each including data for determining a unique identification code, the apparatus comprising:

a) a data processing system for generating a mailing control file comprising a plurality of mailpiece records, each of the records including a plurality of fields, the fields containing data for controlling assembly of a mailpiece, and each of the records including one of the unique identification codes, whereby each of the records defines preparation of at least one corresponding mailpiece, the records also defining the number of documents comprised in each of the mailpieces;

b) storing means for storing said mailing control file, c) means for assembling the mailpieces, the assembling means including an inserter system comprising a chassis for assembling the mailpieces, the chassis operating cyclically with successive accumulations advancing at the end of each cycle, and a document feeder for feeding accumulations of documents to the chassis, the accumulations containing varying numbers of documents;

d) a controller for:

d1) initially operating the chassis at a selected speed and updating the chassis speed in accordance with the records by;

d1.1) determining a measure of the average number of documents to be formed into accumulations for a predetermined number of mail pieces next to be processed by;

d1.2) computing a nominal chassis speed as a function of the measure;

d1.3) determining the difference between the nominal chassis speed and the current chassis speed;

d1.4) if the difference is than a first positive value, increasing the chassis speed; and d1.5) if the difference is less than a first negative value, decreasing the chassis speed; and d2) controlling the assembling means to prepare the corresponding mailpieces in accordance with the records.

* * * * *